US008885299B1

(12) United States Patent
Bennin et al.

(10) Patent No.: US 8,885,299 B1
(45) Date of Patent: Nov. 11, 2014

(54) LOW RESISTANCE GROUND JOINTS FOR DUAL STAGE ACTUATION DISK DRIVE SUSPENSIONS

(75) Inventors: Jeffry S. Bennin, Hutchinson, MN (US); Jacob D. Bjorstrom, Hutchinson, MN (US); Shawn P. Bopp, Savage, MN (US); Reed T. Hentges, Buffalo, MN (US); Michael T. Hofflander, Edina, MN (US); Richard R. Jenneke, Hutchinson, MN (US); Craig A. Leabch, St. Cloud, MN (US); Mark S. Lewandowski, Hutchinson, MN (US); Zachary A. Pokornowski, Cokato, MN (US); Brian D. Schafer, Mound, MN (US); Brian J. Stepien, Glencoe, MN (US); John A. Theget, Hutchinson, MN (US); John E. Theisen, Winsted, MN (US); John L. Wagner, Plymouth, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 162 days.

(21) Appl. No.: 13/114,212

(22) Filed: May 24, 2011

Related U.S. Application Data

(60) Provisional application No. 61/396,239, filed on May 24, 2010.

(51) Int. Cl.
*G11B 5/56* (2006.01)

(52) U.S. Cl.
USPC ...................................... 360/294.3

(58) Field of Classification Search
USPC ............. 360/245.9, 294.4, 294.3, 245.8
See application file for complete search history.

(56) References Cited

U.S. PATENT DOCUMENTS

| | | |
|---|---|---|
| 4,422,906 A | 12/1983 | Kobayashi |
| 4,659,438 A | 4/1987 | Kuhn et al. |
| 5,320,272 A | 6/1994 | Melton et al. |
| 5,521,778 A | 5/1996 | Boutaghou et al. |
| 5,608,591 A | 3/1997 | Klaassen |
| 5,657,186 A * | 8/1997 | Kudo et al. ............... 360/234.5 |
| 5,694,270 A | 12/1997 | Sone et al. |
| 5,754,368 A | 5/1998 | Shiraishi et al. |
| 5,773,889 A | 6/1998 | Love et al. |
| 5,796,552 A | 8/1998 | Akin, Jr. et al. |

(Continued)

FOREIGN PATENT DOCUMENTS

| | | |
|---|---|---|
| JP | 2001057039 A | 2/2001 |
| JP | 2001307442 A | 11/2001 |

(Continued)

OTHER PUBLICATIONS

Cheng et al, "Vapor deposited thin gold coatings for high termperature electrical contacts", Proc. 42nd IEEE Holm Conf. of Electrical Contacts (1996) p. 404-413.*

(Continued)

*Primary Examiner* — Julie Anne Watko
(74) *Attorney, Agent, or Firm* — Faegre Baker Daniels LLP

(57) ABSTRACT

Stable, low resistance conductive adhesive ground connections between motor contacts and a gold-plated contact area on a stainless steel component of a dual stage actuated suspension. The stainless steel component can be a baseplate, load beam, hinge, motor plate, add-on feature or flexure.

15 Claims, 10 Drawing Sheets

(56) References Cited

U.S. PATENT DOCUMENTS

| | | | |
|---|---|---|---|
| 5,812,344 A | 9/1998 | Balakrishnan | |
| 5,818,662 A | 10/1998 | Shum | |
| 5,898,544 A | 4/1999 | Krinke et al. | |
| 5,914,834 A | 6/1999 | Gustafson | |
| 6,046,887 A | 4/2000 | Uozumi et al. | |
| 6,156,982 A * | 12/2000 | Dawson | 200/263 |
| 6,215,622 B1 | 4/2001 | Ruiz et al. | |
| 6,229,673 B1 | 5/2001 | Shinohara et al. | |
| 6,249,404 B1 | 6/2001 | Doundakov et al. | |
| 6,278,587 B1 | 8/2001 | Mei | |
| 6,307,715 B1 | 10/2001 | Berding et al. | |
| 6,330,132 B1 | 12/2001 | Honda | |
| 6,349,017 B1 | 2/2002 | Schott | |
| 6,459,549 B1 | 10/2002 | Tsuchiya et al. | |
| 6,490,228 B2 | 12/2002 | Killam | |
| 6,539,609 B2 | 4/2003 | Palmer et al. | |
| 6,600,631 B1 | 7/2003 | Berding et al. | |
| 6,647,621 B1 | 11/2003 | Roen et al. | |
| 6,661,617 B1 | 12/2003 | Hipwell, Jr. et al. | |
| 6,735,052 B2 | 5/2004 | Dunn et al. | |
| 6,831,539 B1 | 12/2004 | Hipwell, Jr. et al. | |
| 6,833,978 B2 | 12/2004 | Shum et al. | |
| 6,856,075 B1 | 2/2005 | Houk et al. | |
| 6,950,288 B2 | 9/2005 | Yao et al. | |
| 7,064,928 B2 | 6/2006 | Fu et al. | |
| 7,177,119 B1 * | 2/2007 | Bennin et al. | 360/294.6 |
| 7,218,481 B1 | 5/2007 | Bennin et al. | |
| 7,307,817 B1 | 12/2007 | Mei | |
| 7,322,241 B2 | 1/2008 | Kai | |
| 7,382,582 B1 | 6/2008 | Cuevas | |
| 7,385,788 B2 | 6/2008 | Kubota et al. | |
| 7,391,594 B2 | 6/2008 | Fu et al. | |
| 7,403,357 B1 | 7/2008 | Williams | |
| 7,417,830 B1 | 8/2008 | Kulangara | |
| 7,459,835 B1 | 12/2008 | Mei et al. | |
| 7,509,859 B2 | 3/2009 | Kai | |
| 7,625,654 B2 | 12/2009 | Vyas et al. | |
| 7,629,539 B2 | 12/2009 | Ishii et al. | |
| 7,649,254 B2 | 1/2010 | Graydon et al. | |
| 7,832,082 B1 | 11/2010 | Hentges et al. | |
| 7,872,344 B2 | 1/2011 | Fjelstad et al. | |
| 7,914,926 B2 | 3/2011 | Kimura et al. | |
| 7,929,252 B1 | 4/2011 | Hentges et al. | |
| 8,149,542 B2 | 4/2012 | Ando | |
| 8,174,797 B2 | 5/2012 | Iriuchijima | |
| 8,199,441 B2 | 6/2012 | Nojima | |
| 8,228,642 B1 | 7/2012 | Hahn et al. | |
| 8,248,731 B2 | 8/2012 | Fuchino | |
| 8,248,734 B2 | 8/2012 | Fuchino | |
| 8,248,735 B2 | 8/2012 | Fujimoto et al. | |
| 8,248,736 B2 | 8/2012 | Hanya et al. | |
| 8,339,748 B2 | 12/2012 | Shum et al. | |
| 8,553,364 B1 | 10/2013 | Schreiber et al. | |
| 2002/0075606 A1 | 6/2002 | Nishida et al. | |
| 2002/0118492 A1 * | 8/2002 | Watanabe et al. | 360/294.4 |
| 2003/0089520 A1 | 5/2003 | Ooyabu et al. | |
| 2003/0135985 A1 | 7/2003 | Yao et al. | |
| 2004/0181932 A1 | 9/2004 | Yao et al. | |
| 2004/0221447 A1 | 11/2004 | Ishii et al. | |
| 2006/0274452 A1 | 12/2006 | Arya | |
| 2007/0227769 A1 | 10/2007 | Brodsky et al. | |
| 2008/0247131 A1 | 10/2008 | Hitomi et al. | |
| 2009/0135523 A1 | 5/2009 | Nishiyama et al. | |
| 2009/0176120 A1 | 7/2009 | Wang | |
| 2009/0190263 A1 | 7/2009 | Miura et al. | |
| 2009/0294740 A1 | 12/2009 | Kurtz et al. | |
| 2010/0067151 A1 | 3/2010 | Okawara et al. | |
| 2010/0073825 A1 * | 3/2010 | Okawara | 360/294.4 |
| 2010/0097726 A1 * | 4/2010 | Greminger et al. | 360/294.4 |
| 2010/0143743 A1 | 6/2010 | Yamasaki et al. | |
| 2010/0177445 A1 | 7/2010 | Fuchino | |
| 2010/0195252 A1 * | 8/2010 | Kashima | 360/294.4 |
| 2010/0220414 A1 | 9/2010 | Klarqvist et al. | |
| 2010/0246071 A1 * | 9/2010 | Nojima et al. | 360/294.4 |
| 2010/0271735 A1 | 10/2010 | Schreiber | |
| 2011/0013319 A1 | 1/2011 | Soga et al. | |
| 2011/0228425 A1 | 9/2011 | Liu et al. | |
| 2011/0242708 A1 | 10/2011 | Fuchino | |
| 2011/0279929 A1 | 11/2011 | Kin | |
| 2012/0002329 A1 | 1/2012 | Shum et al. | |
| 2012/0113547 A1 | 5/2012 | Sugimoto | |

FOREIGN PATENT DOCUMENTS

| | | |
|---|---|---|
| JP | 2002050140 A | 2/2002 |
| JP | 2004300489 A | 10/2004 |
| JP | 2007115864 A | 5/2007 |

OTHER PUBLICATIONS

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N. R. et al., "A Multilayer Thick-film PZT Actuator for MEMs Applications", Sensors and Actuators A: Physical, vol. 132, No. 1, Nov. 8, 2006, pp. 311-316.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al., "Piezoresistive and Piezoelectric MEMS Strain Sensors for Vibration Detection", Sensors and Smart Structures Technologies for Civil, Mechanical, and Aerospace Systems 2007, Proc. Of SPIE vol. 6529.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Raeymaekers, B. et al., "Investigation of fretting wear at the dimple/gimbal interface in a hard disk drive suspension", Wear, vol. 268, Issues 11-12, May 12, 2010, pp. 1347-1353.

Raeymaekers, Bart et al., "Fretting Wear Between a Hollow Sphere and Flat Surface", Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

Yoon, Wonseok et al., "Evaluation of coated metallic bipolar plates for polymer electrolyte membrane fuel cells", The Journal of Power Sources, vol. 179, No. 1, Apr. 15, 2008, pp. 265-273 (abstract only).

* cited by examiner

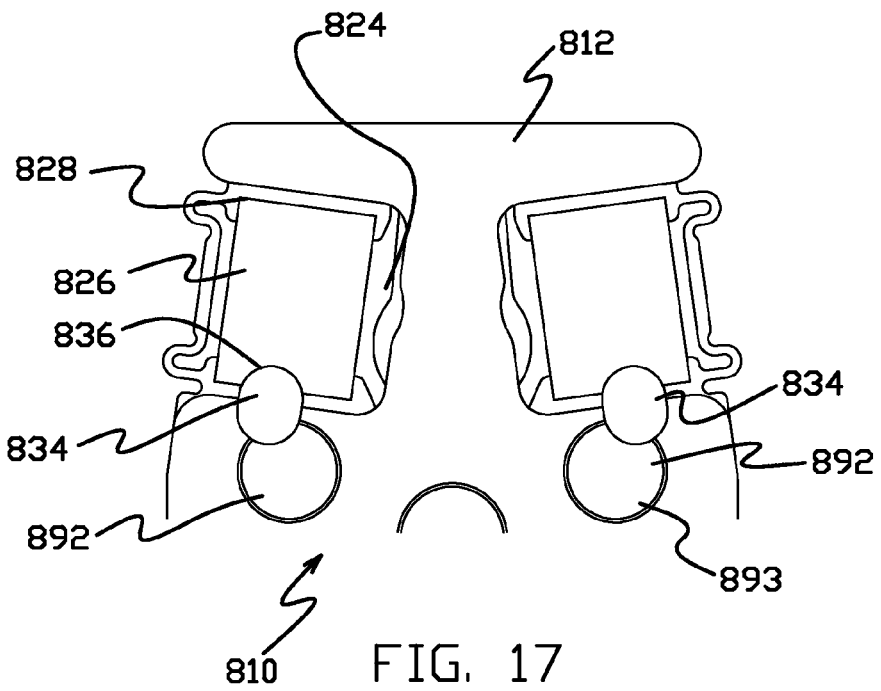
FIG. 17
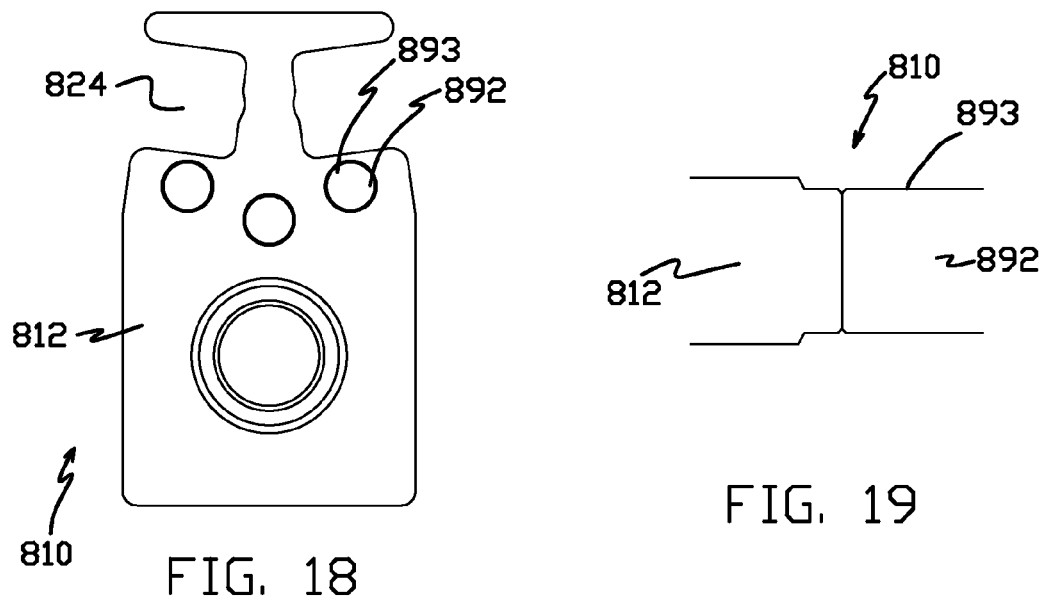
FIG. 18
FIG. 19

LOW RESISTANCE GROUND JOINTS FOR DUAL STAGE ACTUATION DISK DRIVE SUSPENSIONS

CROSS-REFERENCE TO RELATED APPLICATION

This application claims the benefit under 35 U.S.C. 119 of Provisional Application No. 61/396,239, filed May 24, 2010, which is incorporated herein by reference in its entirety for all purposes.

TECHNICAL FIELD

The present invention relates to suspensions for disk drives. In particular, the invention is a dual stage actuation (DSA) suspension and method of manufacture.

BACKGROUND OF THE INVENTION

Dual stage actuation (DSA) disk drive head suspensions are generally known and commercially available. By way of example, one embodiment of a DSA head suspension 10 is shown in FIGS. 1A and 1B. The illustrated DSA suspension includes a baseplate 12, hinge 14 or spring region, load beam 16 and integrated lead flexure 18 with traces 20. The hinge 14 is mounted to the baseplate 12 and extends from the distal end of the baseplate. The load beam is mounted to the distal end of the hinge 14. The flexure 18 is mounted to the load beam 16, typically on the side of the load beam mounted to the hinge 14. Welds such as 22 are typically used to join these components. The baseplate 12, hinge 14 and load beam 16 are typically formed from stainless steel, and the flexure 18 typically includes a base layer of stainless steel. The copper or copper alloy traces 20 on the flexure 18 are separated from the stainless steel base layer by a layer of polyimide or other insulator.

The second stage actuation functionality of the illustrated DSA suspension 10 is incorporated into the baseplate 12. As shown, the baseplate 12 has one or more motor-receiving areas or openings 24 (two in the illustrated embodiment). Piezoelectric (PZT) motors 26 are mounted to the baseplate 12 in the motor-receiving openings 24. The motors 26 are mounted to tabs 28 extending from the baseplate 12 into the motor-receiving openings 24. In the illustrated suspension 10 the tabs 28 are portions of the hinge 14. In other embodiments (not shown) the tabs 28 to which the PZT motors 26 are mounted can be other components such as a separate motor plate welded to the baseplate. Epoxy or other adhesive is typically used to mount the motors 26 to the tabs 28.

DSA suspensions can be embodied in still other forms. For example, an alternative DSA suspension structure is illustrated and described in the Okawara U.S. Patent Publication No. 2010/0067151 which is incorporated herein by reference in its entirety and for all purposes. Briefly, the suspension shown in the Okawara publication has an actuator plate to which the motors are mounted. The actuator plate is mounted between the baseplate and hinge. In still other DSA suspensions (not shown), the motors can be mounted to the load beam or hinge.

An electrical connection or conductive joint between an electrical ground contact on a face of the motor and the ground plane of the suspension is typically made by conductive adhesive (e.g., epoxy with silver and/or nickel particles). The ground contacts on the motors typically have an external plated gold (Au) layer. These connections are typically formed by applying a mass of the conductive adhesive at a location where the ground contact of the motor is adjacent to a stainless steel portion of the baseplate, load beam, hinge or flexure. The conductive adhesive contacts both the motor ground contact and the stainless steel portion of the suspension, thereby providing an electrical connection or ground joint from the motor to the stainless steel portions of the suspension that function as the ground plane.

The conductive joint between the motor and the ground plane should be capable of functioning at or below a threshold level of acceptable resistance under all applied processing and operational load conditions. However, consistently maintaining acceptable resistance to ground levels has been difficult. In particular, the resistance of the conductive adhesive-to-stainless steel component joints have been determined to be relatively high and unstable.

SUMMARY OF THE INVENTION

A dual stage actuation (DSA) suspension in accordance with the invention has a stable, low resistance conductive adhesive electrical connection between an electrical contact on a motor and a plated contact area on a stainless steel component of the suspension. The contact area on the suspension component is plated with conductive and generally non-corrosive metal or metal alloy such as gold or nickel gold. In one embodiment, the stainless steel component includes a stainless steel layer of a flexure and the suspension includes a baseplate having a through hole. The conductive adhesive connection extends from the motor, across a portion of the baseplate, into the though hole of the baseplate and into contact with the plated contact area on the stainless steel layer of the flexure.

BRIEF DESCRIPTION OF THE DRAWINGS

FIG. 17 is a plan view illustration of a portion of a DSA suspension in accordance with an embodiment of the invention having a plated plug.

FIG. 18 is a plan view illustration of the baseplate and plated plug components of the suspension shown in FIG. 17.

FIG. 19 is a cross section side view illustration of the assembled baseplate and plated plug components shown in FIGS. 17 and 18.

DETAILED DESCRIPTION

Overview

The invention is a dual stage actuation (DSA) suspension having a stable, low resistance conductive adhesive electrical connection or joint between an electrical contact on a motor of the suspension and a plated metal contact area on a stainless steel component of the suspension. One embodiment of the invention includes a ground joint between the electrical contact of a piezoelectric (PZT) motor and a gold or nickel gold plated contact area on the stainless steel suspension component. The gold or nickel gold or other conductive and generally non-corrosive metal or alloy plated area on the stainless steel suspension component is referred to generally in the description of the invention below as the plated region. In still other embodiments a layer of nickel is plated on the stainless steel, and a gold layer is plated on the nickel layer.

Figures 1A, 1B:
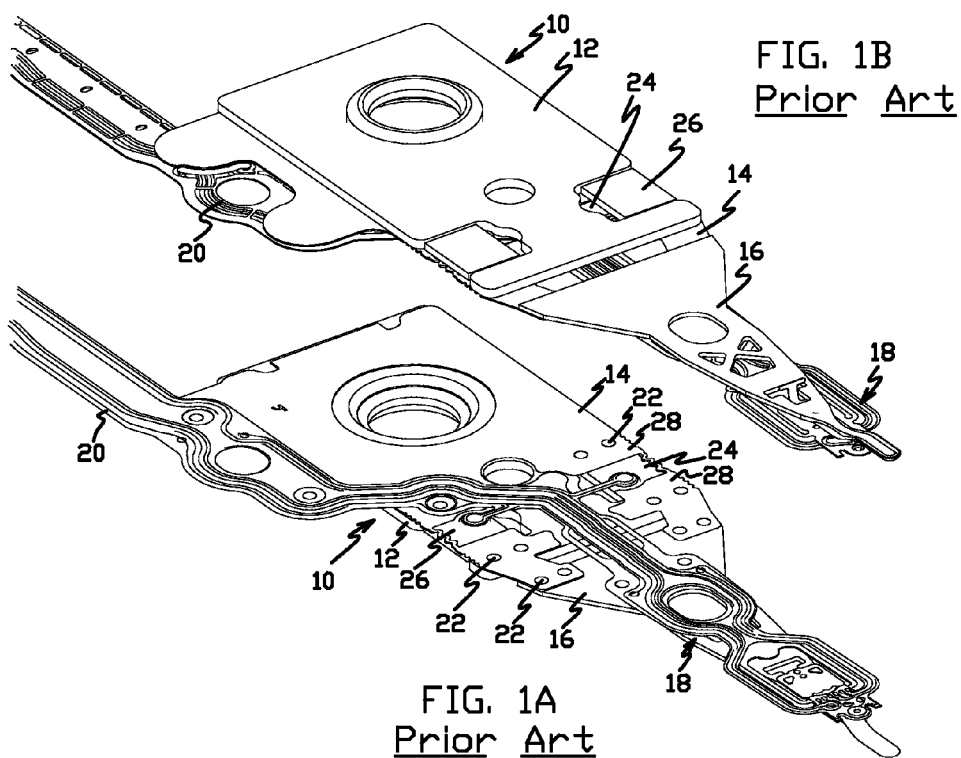
FIG. 1A is an isometric illustration of the flexure side of a prior art dual stage actuation (DSA) suspension.
FIG. 1B is an isometric illustration of the opposite, baseplate side of the prior art suspension shown in FIG. 1A.

As described below in connection with the attached drawing figures, the invention can be embodied in a number of different structures. For example, the invention can be embodied in DSA suspensions such as that described above in connection with FIGS. 1A and 1B. Alternatively, the invention can be embodied in DSA suspension structures of the type disclosed in the Okawara U.S. Patent Publication No. 2010/0067151. For example, the stainless steel suspension component to which the ground joint is made can be a baseplate, load beam, hinge, motor plate, flexure or other component. The plated contact area on the stainless steel suspension component can be heat treat annealed. In some embodiments of the invention, the plated contact surface retains a full surface coverage of the plated alloy. In other embodiments of the invention the plated contact surface includes approximately 98% stainless steel and 2% gold following the heat treat and annealing process. In yet other embodiments, the plated contact surface includes about 90% stainless steel surface and about 10% gold. Only the portion of the component to which the conductive adhesive ground joint is being made need be plated (e.g., patterned and selectively plated), although in other embodiments larger areas or even the entire component surface can be plated.

The invention provides a reliable, stable and low resistance joint between the conductive adhesive and the plated stainless steel contact area. The desired resistance level can vary with the application of the suspension (e.g., with the drive circuitry that the motor is to be connected). One example specification calls for ground contact resistance levels no greater than 2500 ohms. Another specification calls for resistance levels no greater than 100 ohms. Still other embodiments of the invention have a resistance no greater than 10 ohms and even less than 1 ohm over the life of the suspension.

Plated Flexure Embodiments

Figure 2:
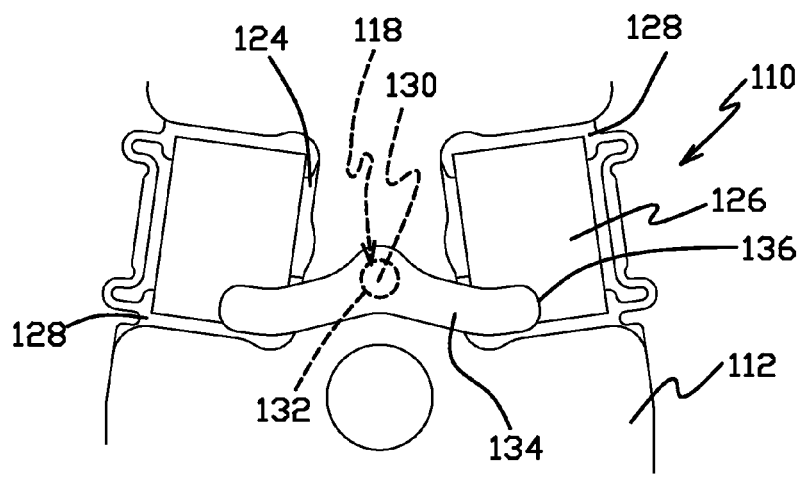
FIG. 2 is a plan view illustration of a portion of a DSA suspension in accordance with an embodiment of the invention having a plated flexure.
Figure 3:
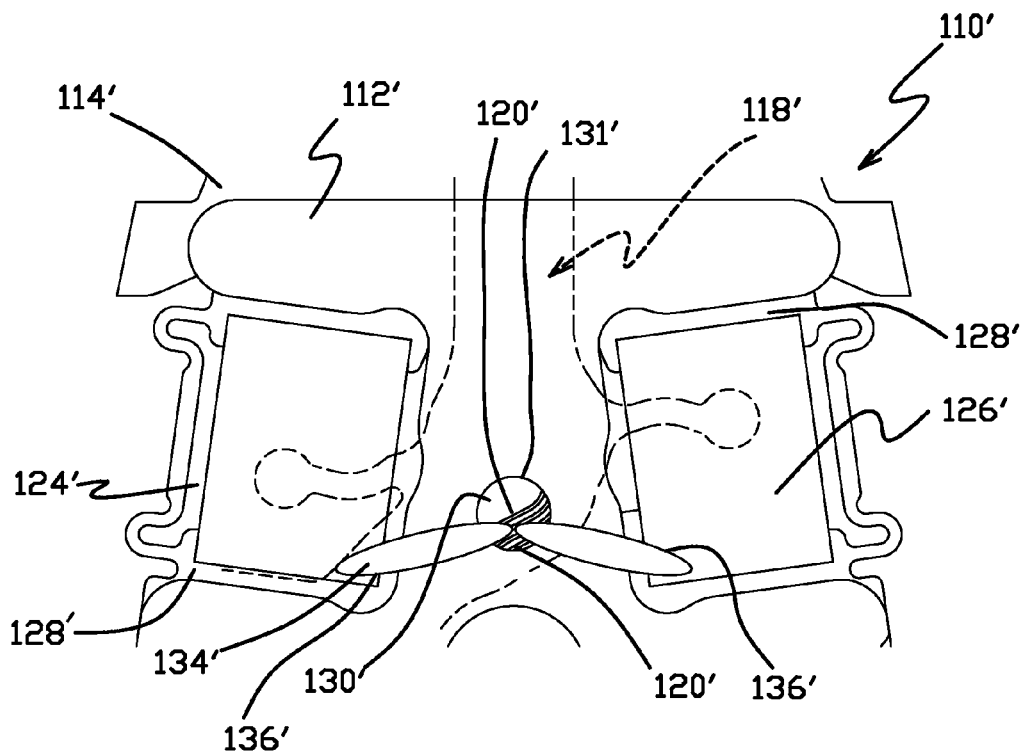
FIG. 3 is a plan view illustration of an alternative embodiment of the suspension shown in FIG. 2.

FIG. 2 illustrates portions of a suspension 110 in accordance with an embodiment of the invention having a through hole or opening 130 in the baseplate 112 that exposes a gold plated contact 132 on the flexure 118. Features of the suspension 110 that are similar to those of suspension 10 described above in connection with FIGS. 1A and 1B are identified by similar reference numbers in the "100" series. Conductive adhesive 134 extends from the motor contact 136, over the baseplate 112, into and through the baseplate opening 130, and to the plated flexure contact 132. The plated contact 132 on the flexure 118 can be a contact plated directly onto the stainless steel base layer of the flexure 118. In an alternative embodiment shown in FIG. 3 illustrating portions of suspension 110' a through hole 131' is etched or otherwise formed through the stainless steel base layer of the flexure 118' to expose a plated portion of a trace 120' on the flexure. In this alternative embodiment the conductive adhesive 134' extend through the holes 130' and 131' in the baseplate 112' and the flexure 118', and contacts the plated flexure trace 120'.

Figure 4:
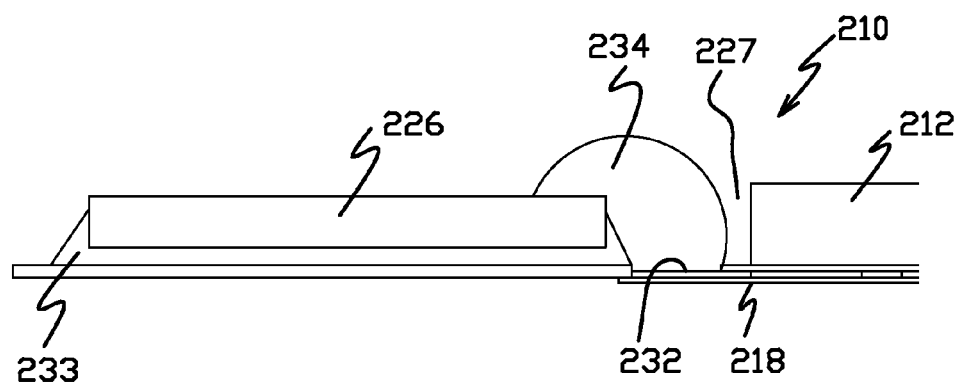
FIG. 4 is a side view illustration of a portion of a DSA suspension in accordance with another embodiment of the invention having a plated flexure.
Figure 5:
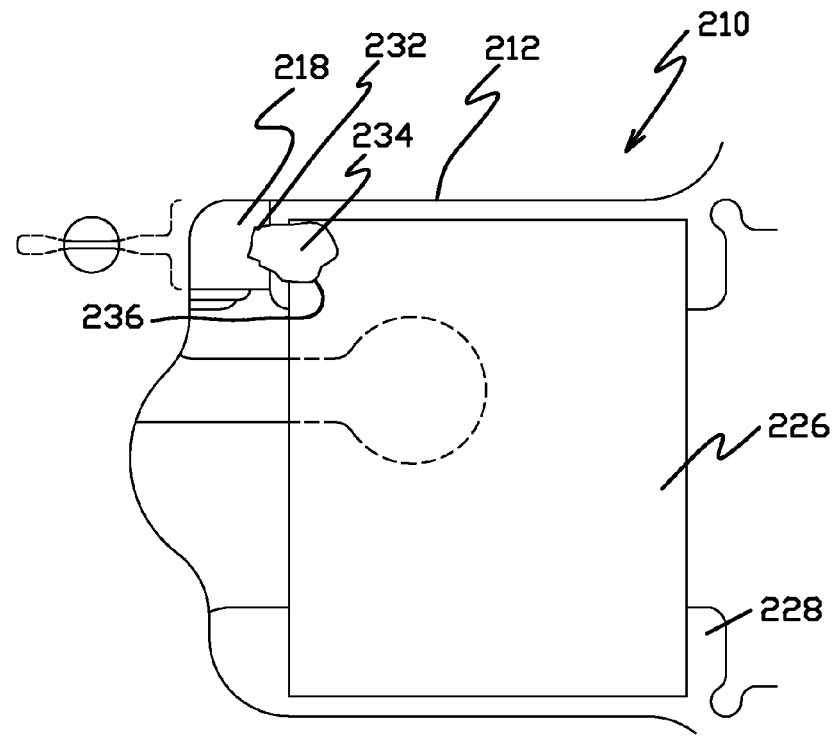
FIG. 5 is a plan view illustration of the suspension shown in FIG. 4.

FIGS. 4 and 5 illustrate portions of a suspension 210 in accordance with another embodiment of the invention. Features of the suspension 210 that are similar to those of suspension 10 described above in connection with FIGS. 1A and 1B are identified by similar reference numbers in the "200" series. In this embodiment the mass of conductive adhesive 234 extends from the motor contact 236, over the edge of the motor 226, into a gap 227 between the motor and baseplate 212, and into contact with the plated contact region 232 on the flexure 218. As with the embodiment shown in FIGS. 2 and 3, the plated contact 232 on the flexure 218 can be on the stainless steel base layer or on a trace exposed at a through hole (not shown) in the flexure. Non-conductive adhesive 233 is used to mount the motor 226 to the hinge tabs 228 and isolate the second (bottom) electrode of the motor from the conductive adhesive 234 of the ground joint.

Formed Flexure Embodiments

Figure 6:
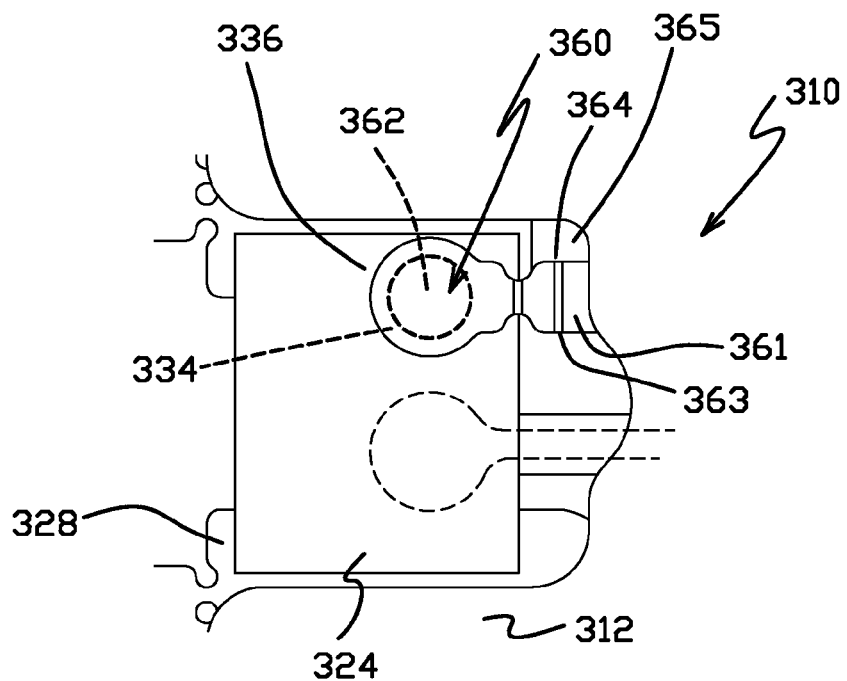
FIG. 6 is a plan view illustration of a portion of a DSA suspension in accordance with another embodiment of the invention having a formed flexure tab.
Figure 7:
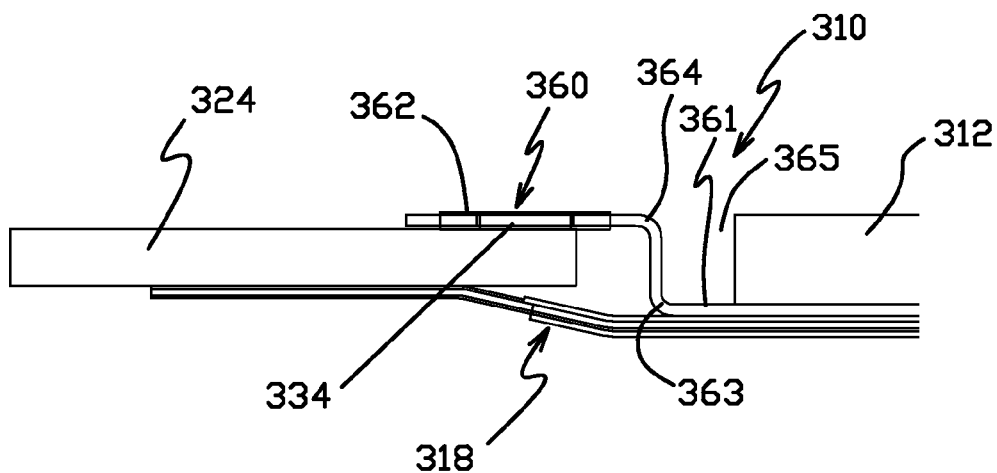
FIG. 7 is a side view illustration of the suspension shown in FIG. 6.

FIGS. 6 and 7 illustrate portions of a suspension 310 in accordance with another embodiment of the invention having a flexure 318 with a tab 360 or paddle on the stainless steel base layer 361 that has a plated contact 362. Features of the suspension 310 that are similar to those of suspension 10 described above in connection with FIGS. 1A and 1B are identified by similar reference numbers in the "300" series. The flexure tab 360 is formed (e.g., two 90° bends 363, 364 are shown) to extend out of the plane of the other portions of the flexure 318, through a gap 365 between the baseplate 312 and motor 324, and into contact with the ground contact 336 on the motor. A mass of conductive adhesive 334 joins the plated contact 362 on the formed flexure tab 360 to the motor ground contact 336.

Plated Hinge Embodiments

Figure 8:
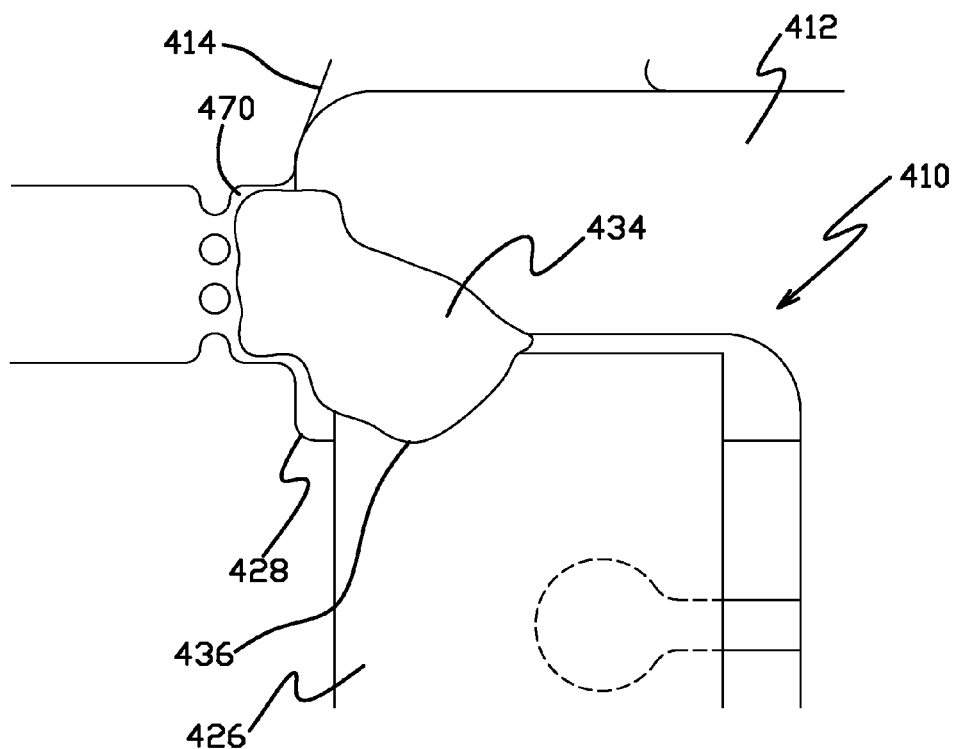
FIGS. 8 and 9 are plan view illustrations of portions of a DSA suspension in accordance with another embodiment of the invention having a plated hinge.
Figure 9:
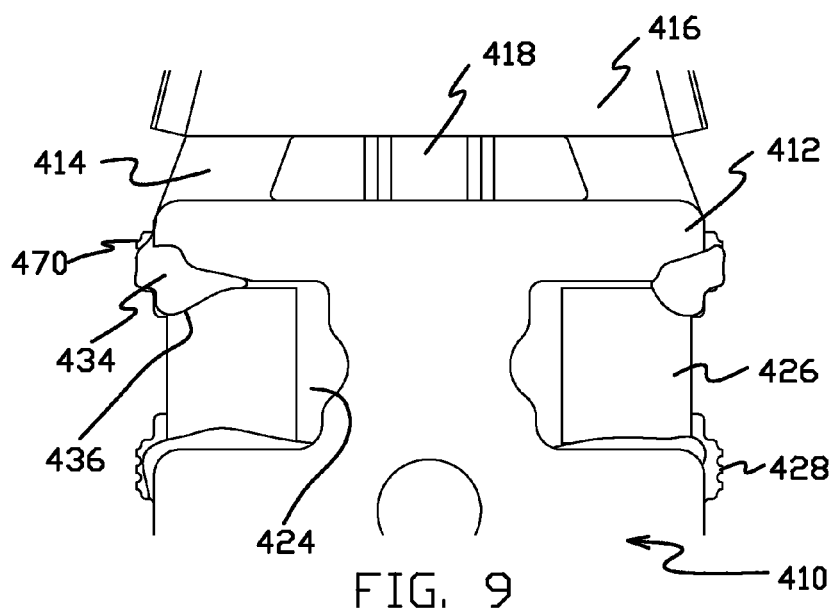

FIGS. 8 and 9 illustrate portions of a suspension 410 in accordance with another embodiment of the invention having a plated contact 470 on a portion of the hinge near or adjacent to the motor 426 (e.g., the hinge motor tab). FIG. 9 shows the suspension 410 after a de-tabbing step relative to FIG. 8. Features of the suspension 410 that are similar to those of suspension 10 described above in connection with FIGS. 1A and 1B are identified by similar reference numbers in the "400" series. The conductive adhesive 434 extends from the motor contact 436 over the edge of the motor 426 and into contact with the plated contact 470 on the hinge 414. In the illustrated embodiments the conductive adhesive 434 also extends over a portion of the baseplate 412 and the edge of the baseplate.

Figure 10:
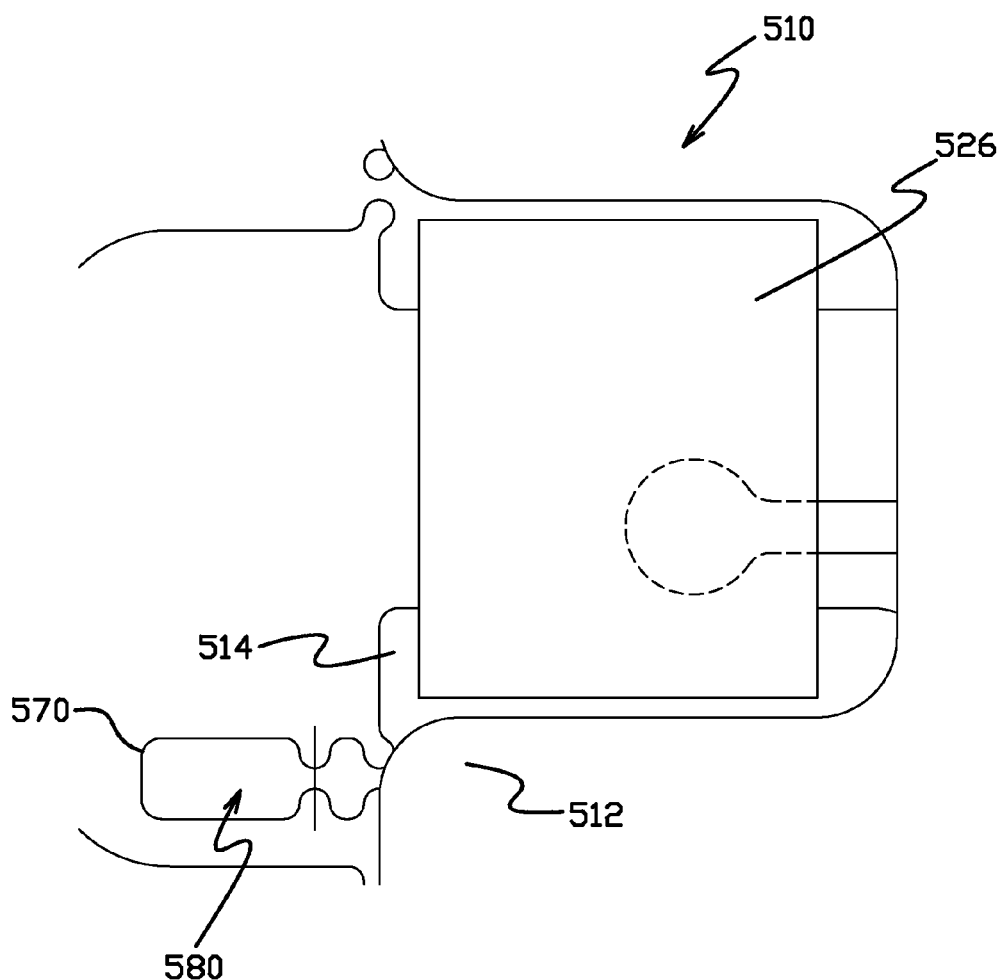
FIGS. 10 and 11 are plan view illustrations of portions of a DSA suspension in accordance with another embodiment of the invention having a plated hinge having a tab. The tab is shown unformed in FIG. 10 and formed in FIG. 11.
Figure 11:
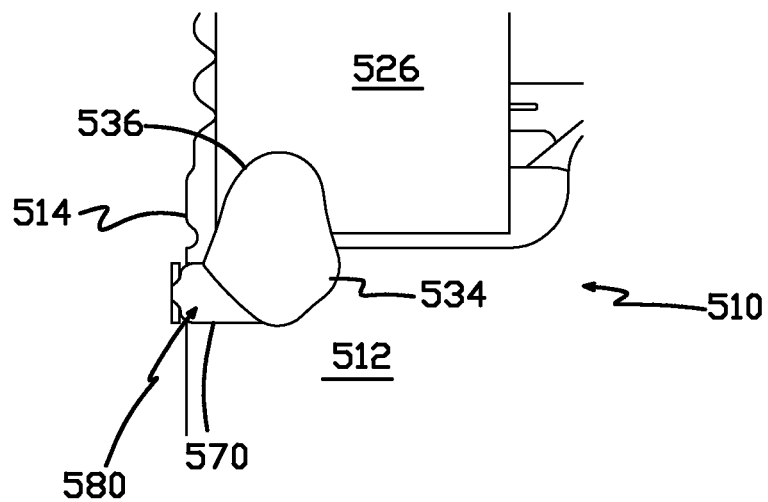
Figure 12:
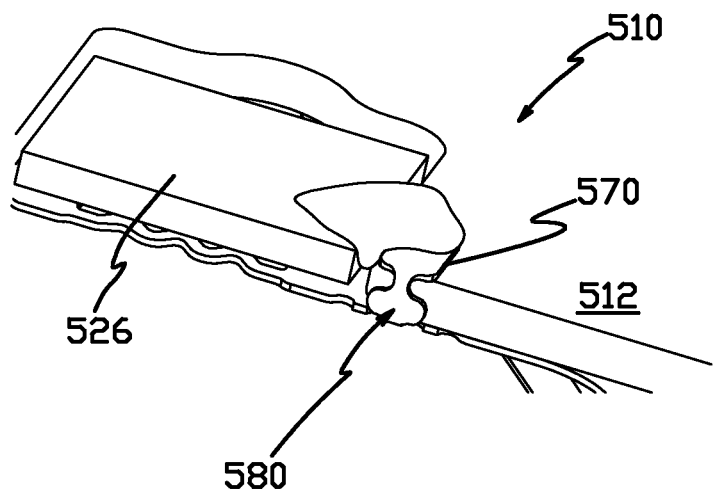
FIG. 12 is an isometric illustration of the suspension shown in FIG. 11.

FIGS. 10-12 illustrate portions of suspension 510 in accordance with another embodiment of the invention having a formed plated hinge 514. Features of the suspension 510 that are similar to those of suspension 10 described above in connection with FIGS. 1A and 1B are identified by similar reference numbers in the "500" series. A plated contact 570 is formed on a tab 580 extending from the hinge 514. The tab 580 is shown in an unformed state in FIG. 10. During suspension 510 assembly the tab 580 is formed to extend up the edge and over the baseplate 512 at a location adjacent to the motor 526. The conductive adhesive 534 extends between the motor ground contact 536 and the plated contact 570 on the formed tab 580, across the baseplate 512.

Add-On Feature Embodiments

Figure 13:
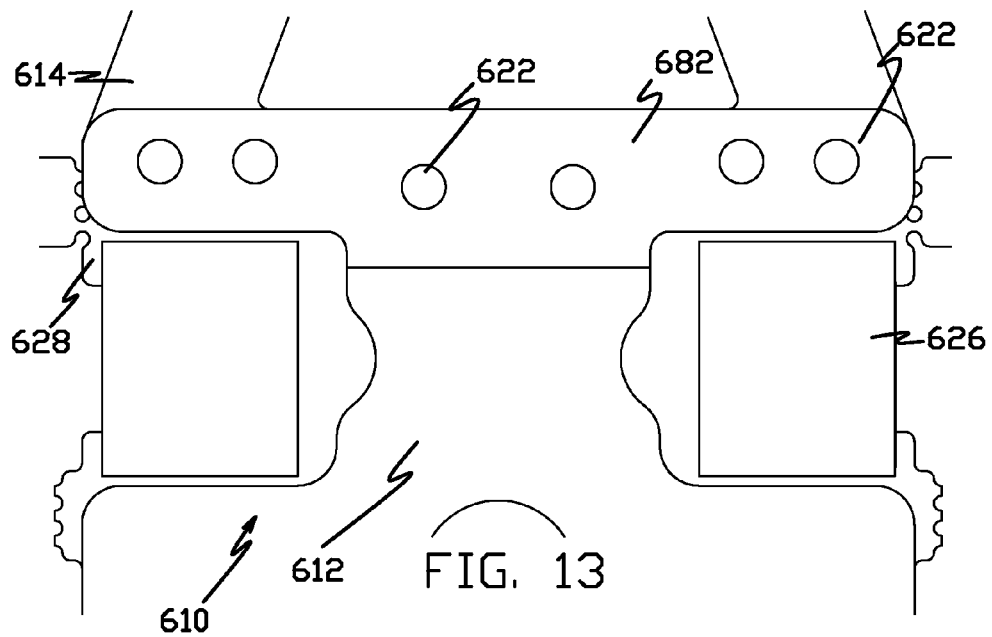
FIGS. 13 and 14 are plan view illustrations of portions of a DSA suspension in accordance with another embodiment of the invention having a plated add-on feature.
Figure 14:
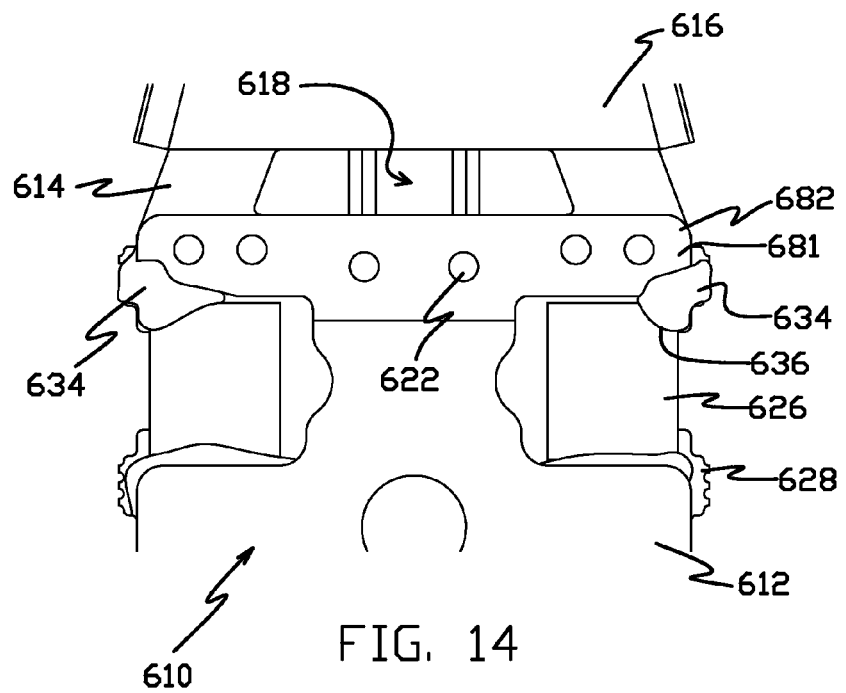

FIGS. 13 and 14 illustrate portions of a suspension 610 in accordance with another embodiment of the invention including a separately manufactured plated element or feature 682 that is welded (e.g., by welds 622) or otherwise attached to the baseplate 612 adjacent to the motors 626. The conductive adhesive 634 extends from the motor contact pad 636 to the plated surface 681 of the feature 682, over the edge of the feature. FIG. 14 shows the suspension 610 after a de-tabbing step and application of conductive adhesive 634 relative to FIG. 13.

Plated Baseplate Embodiments

Figure 15:
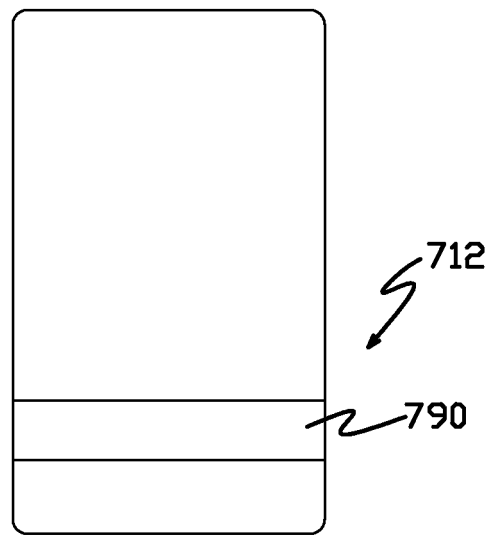
FIG. 15 is a plan view illustration of a plated unformed baseplate in accordance with another embodiment of the invention.
Figure 16:
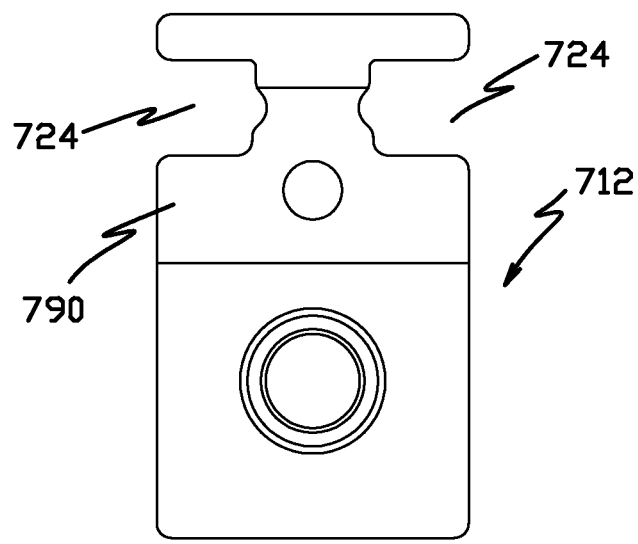
FIG. 16 is a plan view illustration of the plated baseplate in FIG. 15 in the formed state.

FIGS. 15 and 16 illustrate plated baseplates 712 in accordance with another embodiment of the invention. A plated stripe 790 is formed on the baseplate stock. FIG. 15 shows the baseplate 712 unformed. The stock is formed with the plated stripe 790 located adjacent to the motor openings 724 as shown in FIG. 16. The mass of conductive adhesive (not shown) will extend between the motor contact (not shown) and the plated portion 790 of the baseplate 712.

Plated Plug Baseplate

FIGS. 17-19 illustrate portions of a suspension 810 in accordance with another embodiment of the invention including plated stainless steel plugs 892 in the baseplate 812. Features of the suspension 810 that are similar to those of suspension 10 described above in connection with FIGS. 1A and 1B are identified by similar reference numbers in the "800" series. The plated plugs 892 can be manufactured separately from the baseplate 812, and mechanically forced into holes in the baseplate with the plated surface 893 oriented toward the same side of the baseplate as the motor contacts 836. The plug 892 can be press fit, coined or otherwise forced into the hole in the baseplate 812 to form a substantial and secure mechanical, and low resistance contact between the plug and baseplate. Coining provides the additional advantage of leaving a depression that can be useful in adhesive wicking control. FIG. 19 is a cross section view of an assembled baseplate 812 and plated plug 892. The conductive adhesive 834 is applied so that it extends between the plated surface 893 of the plug 892 and the motor ground contact 836.

Although the invention is described with reference to a number of different embodiments, those skilled in the art will recognize that changes can be made in form and detail without departing from the spirit and scope of the invention.

The invention claimed is:

1. A dual stage actuation suspension, including:
a stainless steel component having a plated contact, the plated contact comprising a first material plated directly on a second material, the first material conductive and non-corrosive, the first material comprising a metal or metal alloy, the second material comprising stainless steel of the stainless steel component, the stainless steel component including a stainless steel layer of a flexure;
a motor having an electrical contact; and
a conductive adhesive joint between the electrical contact of the motor and the plated contact of the stainless steel component, the conductive adhesive joint extending from the motor, over an edge of the motor and into contact with the plated contact on the stainless steel layer of the flexure.

2. The suspension of claim 1 wherein the first material is gold or gold and nickel.

3. The suspension of claim 2 wherein the electrical contact on the motor is a ground contact.

4. The suspension of claim 3 wherein the motor is a PZT motor.

5. The suspension of claim 1 wherein:
the stainless steel component includes a hinge; and
the conductive adhesive joint extends from the motor to the plated contact on the hinge.

6. The suspension of claim 5 wherein the conductive adhesive extends from a contact area on the motor, over an edge of the motor and onto the plated contact on the hinge.

7. The suspension of claim 6 wherein:
the suspension further includes a baseplate; and
the conductive adhesive extends over an edge of the baseplate.

8. The suspension of claim 5 wherein:
the suspension further includes a baseplate; and
the conductive adhesive extends over an edge of the baseplate.

9. The suspension of claim 1 wherein:
the stainless steel component includes a hinge having a formed tab; and
the conductive adhesive joint extends between the plated contact on the formed tab and the motor.

10. The suspension of claim 9 wherein:
the suspension further includes a baseplate;
the formed tab extends over the baseplate; and
the conductive adhesive joint extends over the baseplate.

11. The suspension of claim 1 wherein:
the suspension further includes a baseplate;
the stainless steel component is a feature welded to the baseplate; and
the conductive adhesive joint extends from the motor to the plated contact on the feature.

12. The suspension of claim 1 wherein:
the suspension further includes a baseplate; and
the conductive adhesive joint extends between the plated contact on the baseplate and the motor.

13. A dual stage actuation suspension including:
a stainless steel component having a plated contact, the plated contact comprising a first material plated directly on a second material, the first material conductive and non-corrosive, the first material comprising a metal or metal alloy, the second material comprising stainless steel of the stainless steel component, the stainless steel component including a stainless steel layer of a flexure;
a motor having an electrical contact;
a conductive adhesive joint between the electrical contact of the motor and the plated contact of the stainless steel component; and
a baseplate having a through hole,
wherein the conductive adhesive joint extends from the motor, across a portion of the baseplate, into the though hole of the baseplate and into contact with the plated contact on the stainless steel layer of the flexure.

14. A dual stage actuation suspension including:
a stainless steel component having a plated contact, the plated contact comprising a first material plated directly on a second material, the first material conductive and non-corrosive, the first material comprising a metal or metal alloy, the second material comprising stainless steel of the stainless steel component, the stainless steel component including a stainless steel layer of a flexure having a through hole in the stainless steel layer, the through hole exposing plated traces;
a motor having an electrical contact;
a conductive adhesive joint between the electrical contact of the motor and the plated contact of the stainless steel component; and
a baseplate having a through hole aligned with the through hole in the flexure,
wherein the conductive adhesive joint extends from the motor, across a portion of the baseplate, into the though holes of the baseplate and flexure and into contact with the plated contact on the traces of the flexure.

15. A dual stage actuation suspension including:
a stainless steel component having a plated contact, the plated contact comprising a first material plated directly on a second material, the first material conductive and non-corrosive, the first material comprising a metal or metal alloy, the second material comprising stainless steel of the stainless steel component;
a motor having an electrical contact;
a conductive adhesive joint between the electrical contact of the motor and the plated contact of the stainless steel component; and
a baseplate having a hole;
wherein the stainless steel component includes a plated plug force fit into the hole in the baseplate, and
wherein the conductive adhesive joint extends from the plated contact on the plated plug onto the motor.

* * * * *